Mar. 6, 1923.
J. SCHWAB
AUTOMOBILE TUBE
Filed Apr. 14, 1922
1,447,521
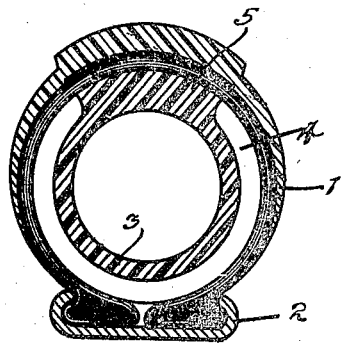
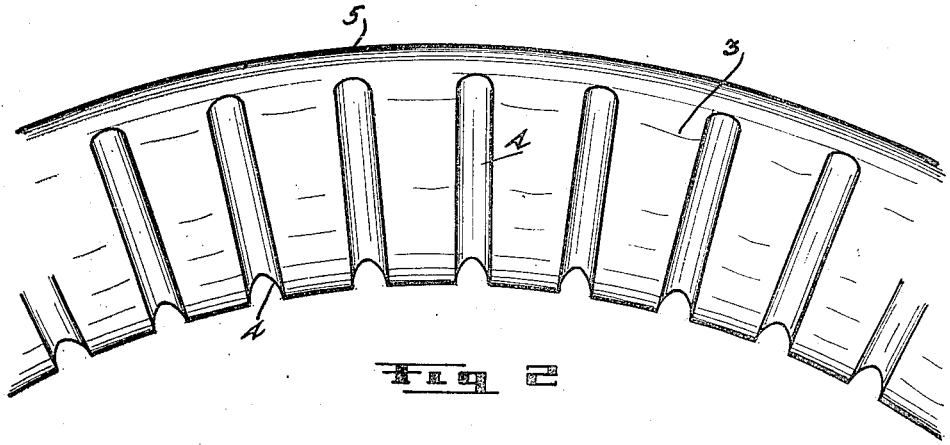
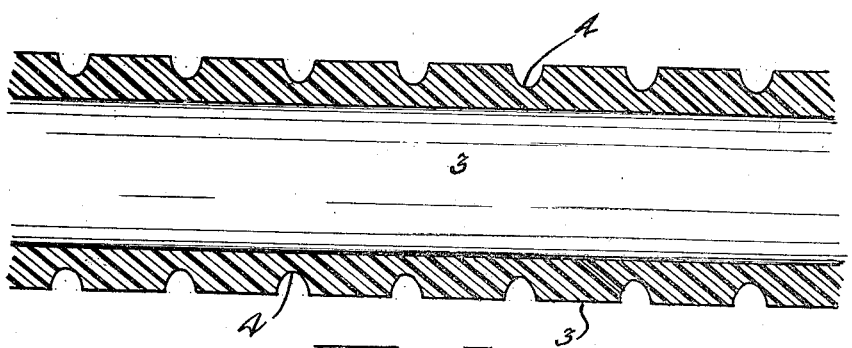
INVENTOR
J. Schwab
By
Attys Patented Mar. 6, 1923.

1,447,521

UNITED STATES PATENT OFFICE.

JOHN SCHWAB, OF WINNIPEG, MANITOBA, CANADA.

AUTOMOBILE TUBE.

Application filed April 14, 1922. Serial No. 552,521.

*To all whom it may concern:*

Be it known that I, JOHN SCHWAB, of the city of Winnipeg, in the Province of Manitoba, Canada, have invented certain new and useful Improvements in Automobile Tubes, of which the following is the specification.

The invention relates to automobile tubes and particularly to an inner tube for an automobile tire and the object of the invention is to provide an inner tube which cannot readily be punctured, and which if punctured on the tread side, will seal itself and further an inner tube which will not blow out under normal pressure in event of the outer casing being cut or torn and which will withstand reasonable excessive inflating pressures and will accommodate any increased air pressure brought about by temperature changes.

With the above more important objects in view the invention consists essentially of a comparatively thick walled rubber tube having suitably spaced grooves formed in the outer side thereof and passing from side to side of the tube, the parts being arranged and constructed as hereinafter more particularly described and later pointed out in the appended claims, reference being had to the accompanying drawing in which:

Fig. 1 is a cross sectional view through a tire equipped with my inner tube.

Fig. 2 is a side view of a portion of the inner tube.

Fig. 3 is a longitudinal sectional view centrally through a portion of the inner tube.

In the drawing like characters of reference indicate corresponding parts in the several figures.

The outer casing 1 of the automobile tire is of the usual or conventional form and it is mounted in the customary manner on the metallic rim 2.

Within the casing I locate my inflatable inner tube 3.

The tube which I provide is preferably formed from what is known as cushioning rubber and the wall thereof is relatively thick as best shown in Figures 1 and 2. In the outer side of the tube I form a plurality of suitably spaced transversely extending comparatively deep grooves or channels 4, the ends of the grooves being terminated to reserve a full thickness of the tube at the tread side thereof or as indicated at 5. The grooves are preferably semi-elliptical in cross section and in actual practice it is my intention that the thickness of the tube at the bases of the channels be sufficient to withstand the normal inflating pressure for which the tube is designed. In other words, if the tire in which my tube is installed is intended to carry forty pounds of air pressure, then the thickness of the rubber at the bases of the channels should withstand that amount of pressure without giving away. For tires requiring greater pressure for ordinary road conditions the thickness of the tube at the base of the grooves will be designed accordingly.

By reserving the full thickness of the tube at the tread side it will be obvious that nails, glass and such like, which customarily causes punctures, will not penetrate sufficiently far to puncture through the inner tube. If a nail or such like, however, does puncture through the tread side of the tube it can be withdrawn and there is sufficient thickness of the rubber to permit it to seal itself and particularly in view of the fact that the tube is made from what is known as cushioning rubber.

In instances where the tube may be inflated reasonably above the normal pressure for which it is designed or in instances where the pressure in the tube increases, due to temperature changes, there is no possibility of the tube blowing out as the pockets formed by the channels permit of the expansion of the tube at the channels an amount amply sufficient to accomodate the increased pressure so brought about. Obviously the tube will expand at its weakest parts when the excessive pressure occurs and these weakest parts are at the channels and the rubber of the tube at these points swell outwardly and without being restricted by the casing.

What I claim as my invention is:

1. An inner rubber tube having suitably spaced channels formed in the outer wall thereof and passing from side to side and with the ends of the channels terminated such that no channel crosses the tread side of the tube.

2. A comparatively thick rubber tube having suitably spaced channels formed in the outer wall thereof and passing transversely of the tube and with the ends of the channels terminated such that no channel crosses the tread side of the tube and with the rubber at the bases of the channels reserved sufficiently thick to withstand the normal inflating pressure for which the tube is designed.

3. The combination with an automobile tire casing of a comparatively thick inflatable rubber tube inserted in the casing and having spaced channels formed in the outer wall thereof and passing from one side of the tube to the other and having the ends thereof terminated to retain the tread side of the tube of full thickness.

4. An inner tube of relatively thick material formed with a tread portion of uniform thickness throughout and, opposite the tread portion, with exterior channels to afford expansion clearance between the tube and the casing.

5. An inner tube for pneumatic tires provided with a tread portion of uniform thickness throughout, and with exterior clearance channels on opposite sides of the tread.

Signed at Winnipeg, this 5th day of April, 1922.

JOHN SCHWAB.

In the presence of—
GERALD S. ROXBURGH,
M. B. KELLEHER.